(12) United States Patent
Doutreloigne

(10) Patent No.: US 6,531,852 B2
(45) Date of Patent: Mar. 11, 2003

(54) DEVICE AND METHOD FOR GENERATING A HIGH VOLTAGE

(75) Inventor: Jan Doutreloigne, Gent (BE)

(73) Assignee: Interuniversitair Microelektronica Centrum (IMEC) (BE)

( * ) Notice: Subject to any disclaimer, the term of this patent is extended or adjusted under 35 U.S.C. 154(b) by 0 days.

(21) Appl. No.: 09/961,072

(22) Filed: Sep. 21, 2001

(65) Prior Publication Data

US 2002/0105289 A1 Aug. 8, 2002

Related U.S. Application Data

(60) Provisional application No. 60/234,587, filed on Sep. 22, 2000.

(30) Foreign Application Priority Data

Sep. 22, 2000 (EP) ................................ 00870207

(51) Int. Cl.[7] .............................. G05F 1/40; G05F 1/44
(52) U.S. Cl. ....................... 323/282; 323/284; 323/222
(58) Field of Search ................................ 323/222, 223, 323/282, 283, 284

(56) References Cited

U.S. PATENT DOCUMENTS

| 5,627,460 A | | 5/1997 | Bazinet et al. | |
|---|---|---|---|---|
| 5,737,197 A | * | 4/1998 | Krichtafovitch et al. | 363/17 |
| 5,747,975 A | * | 5/1998 | Colandrea et al. | 323/276 |
| 5,901,052 A | | 5/1999 | Strijker | |
| 5,923,154 A | * | 7/1999 | Moller | 323/222 |
| 5,994,885 A | * | 11/1999 | Wilcox et al. | 323/283 |
| 6,037,754 A | * | 3/2000 | Harper | 323/222 |
| 6,058,033 A | * | 5/2000 | Williams et al. | 323/300 |
| 6,127,815 A | * | 10/2000 | Wilcox | 323/282 |
| 6,201,375 B1 | * | 3/2001 | Larson et al. | 323/277 |
| 6,215,287 B1 | * | 4/2001 | Matsushiro et al. | 323/222 |
| 6,304,066 B1 | * | 10/2001 | Wilcox et el. | 323/282 |
| 6,370,039 B1 | * | 4/2002 | Telefus | 363/131 |

FOREIGN PATENT DOCUMENTS

EP 0944159 A2 9/1999

OTHER PUBLICATIONS

"Front–Lit Flat Panel Display from Polymer Stabilized Cholesteric Textures," Doane et al., *Japan Display* '92 pp. 73–76.

* cited by examiner

Primary Examiner—Bao Q. Vu
(74) Attorney, Agent, or Firm—Jones, Day, Reavis & Pogue (57) ABSTRACT

The present invention is related to a high voltage generating device comprising a high voltage generating component having as input a voltage signal constructed at least by comparing a reference current and a feedback current, said feedback current being related to the output voltage generated by said high voltage generating component.

16 Claims, 9 Drawing Sheets

DEVICE AND METHOD FOR GENERATING A HIGH VOLTAGE

CROSS REFERENCES TO RELATED APPLICATIONS

The present application is related to and claims priority from the following co-pending patent applications:

U.S. Provisional Patent Application No. 60/234,587, entitled, "A HIGH VOLTAGE GENERATING DEVICE, HIGH VOLTAGE GENERATION METHODS AND USE OF SAID HIGH VOLTAGE GENERATING DEVICES", filed on Sep. 22, 2000 in the U.S. Patent and trademark Office, currently pending and is incorporated by reference herein in its entirety; and E.P. No. 0087/0207.8, entitled "DEVICE AND METHOD FOR GENERATING A HIGH VOLTAGE" filed on Sep. 22, 2000, currently pending and is incorporated by reference herein in its entirety.

BACKGROUND OF THE INVENTION

Field of the Invention

The present invention is related to a device in which a variable high voltage can be generated. The present invention is equally related to the use of such a device and to a method of generating a high voltage.

BRIEF SUMMARY OF THE INVENTION

The present invention is equally related to the use of a high voltage generating device according to the invention, wherein the output voltage magnitude is determined by inputting said digital input. The present invention aims to provide a high voltage generating device which does not suffer from the disadvantages of existing devices.

In a first aspect of the invention, high voltage generating device, wherein a variable high voltage output voltage can easily be selected, is presented. Said high voltage generating device exploits current control of the high voltage generating component (e.g., charge pump), within said device in combination with feedback control from said output voltage to said current control circuitry.

A high voltage generating device is thus presented with a charge pump/high voltage generating component having as input a voltage signal constructed by a current control circuit inputting at least one feedback current related to the output voltage generated by said charge pump/high voltage generating device. Alternatively, said high voltage generating device can be described as comprising a charge pump/high voltage generating component having as input a voltage signal constructed at least by comparing a reference current and a feedback current being related to the output voltage generated by said charge pump/high voltage generating component.

In a first embodiment of said first aspect, said device further comprises a voltage to current converter, generating said feedback current from said output voltage.

In a second embodiment of said first aspect, said device comprises a current comparator generating said voltage signal by comparing said reference current and said feedback current.

In a third embodiment of said first aspect, one recognizes that the choice of current control of said high voltage generating component enables a flexible operation of said device, meaning easy selection of the required output voltage. A high voltage generating device with variable output voltage (within certain range, of course) is obtained.

In a further embodiment thereof, the variability of said output voltage is obtained by introducing an easy modifiability of said reference current by constructing it as a combination of a plurality of basis currents, preferably a linear combination, thus summing of basis currents being multiplied with a certain constant. Said basis currents are selected to be currents with a substantially different value. Said multiplication constant is preferably one or zero, which enables the use of a digital input. The high voltage generating device comprises circuitry wherein each of said plurality of substantially different valued basis currents is selected to be part of said combination based on a digital input to said circuitry. Within said device multiplying circuitry and a current combination part is found. Said multiplying can be adapted such that it takes into account the digital nature of the signals, thus the fact that either selection (in case of a 1) or no selection (in case of a 1) of the basis current under consideration must be realized.

In a further embodiment of the invention, preventions against oscillations are taken by introduction of hysteresis, more in particular by adapting the reference current according to said input voltage. This is realized by making the reference current slightly adaptable, meaning with a certain range, based on the input voltage of said high voltage generating component. Said range for adapting is smaller than the level of the basis current with the smallest level. In this way, the charge pump remains in the activated or disabled state for a longer period of time thereby preventing all kinds of instabilities.

In a second aspect of the invention, a flexible method for generating high voltage outputs is presented. Said method is flexible because a variable high output voltage is selected by inputting a digital input signal, further used for constructing a reference current as a (linear) combination of basis currents with substantially different current values wherein each of said basis current being selected to be part of said (linear) combination according to said digital input signal. Said method is further characterized in that a feedback loop is present, meaning that the generating of the output voltage is related to an input voltage constructed by comparing said reference current with a feedback current being related said output voltage.

In a third aspect of the invention, the use of a high voltage apparatus, more in particular the selection of said variable output voltage based on a digital input is presented.

The present invention is related to a high voltage generating device comprising a high voltage generating component, generating an output voltage and having as input a voltage signal constructed at least by comparing a reference current and a feedback current, a voltage to current converter, generating said feedback current on the basis of said output voltage, and a means for adapting said reference current according to said voltage signal.

According to an exemplary embodiment, the device of the invention is supplied by a low supply voltage, and said output voltage is equal to or higher than said supply voltage.

The device of the invention may further comprise a current comparator, generating said voltage signal by comparing said reference current and said feedback current.

According to an exemplary embodiment of the device of the invention, said high voltage generating component is a charge pump, in particular comprising an inductance, a capacitance, and an external oscillator.

In the device according the invention, said reference current is constructed as a combination of a plurality of basis currents, wherein said combination may be a linear combination.

The device according to the invention may comprise circuitry wherein each of said plurality of basis currents is selected to be part or not to be part of said combination based on a digital input to said circuitry. Said circuitry comprises a voltage to current converter to provide basis currents based on a voltage reference, a means for multiplying said basis currents with a coefficient, said coefficient being the logical value of one of a first set of input control bits, a means for summing said basis currents after said multiplying, said summing resulting in said reference current.

In the device of the invention, said reference current is adaptable according to said voltage signal within a range being smaller than the current level of the basis current with the smallest level. According to an exemplary embodiment of the invention, this is obtained by a hysteresis block, said block comprising a voltage to current converter for providing a plurality of basis currents, a means for multiplying said basis currents with a coefficient, said coefficient being the logical value of one of a second set of input control bits, a means for summing up said basis currents after said multiplying, a means for multiplying said summed current with a coefficient, said coefficient being the digital output of said current comparator, and a means for adding said current after said multiplying to said reference current.

According to an exemplary embodiment, said device is designed and fabricated in a 100V c07 $I^2T$ technology.

The present invention is equally related to a method for generating a high voltage comprising the steps of inputting a digital input signal, constructing a reference current as a combination of basis currents with substantially different current values wherein each of said basis currents is selected to be part or not to be part of said combination on the basis of said digital input signal, and generating an output voltage being related to an input voltage constructed by comparing said reference current with a feedback current being related to said output voltage.

DETAILED DESCRIPTION OF THE INVENTION

A high voltage generating device according to the present invention is characterized by the fact that it uses current control of the high voltage generating component (e.g., a charge pump) within the device in combination with feedback control from the output voltage to the current control circuitry.

Figure 1:
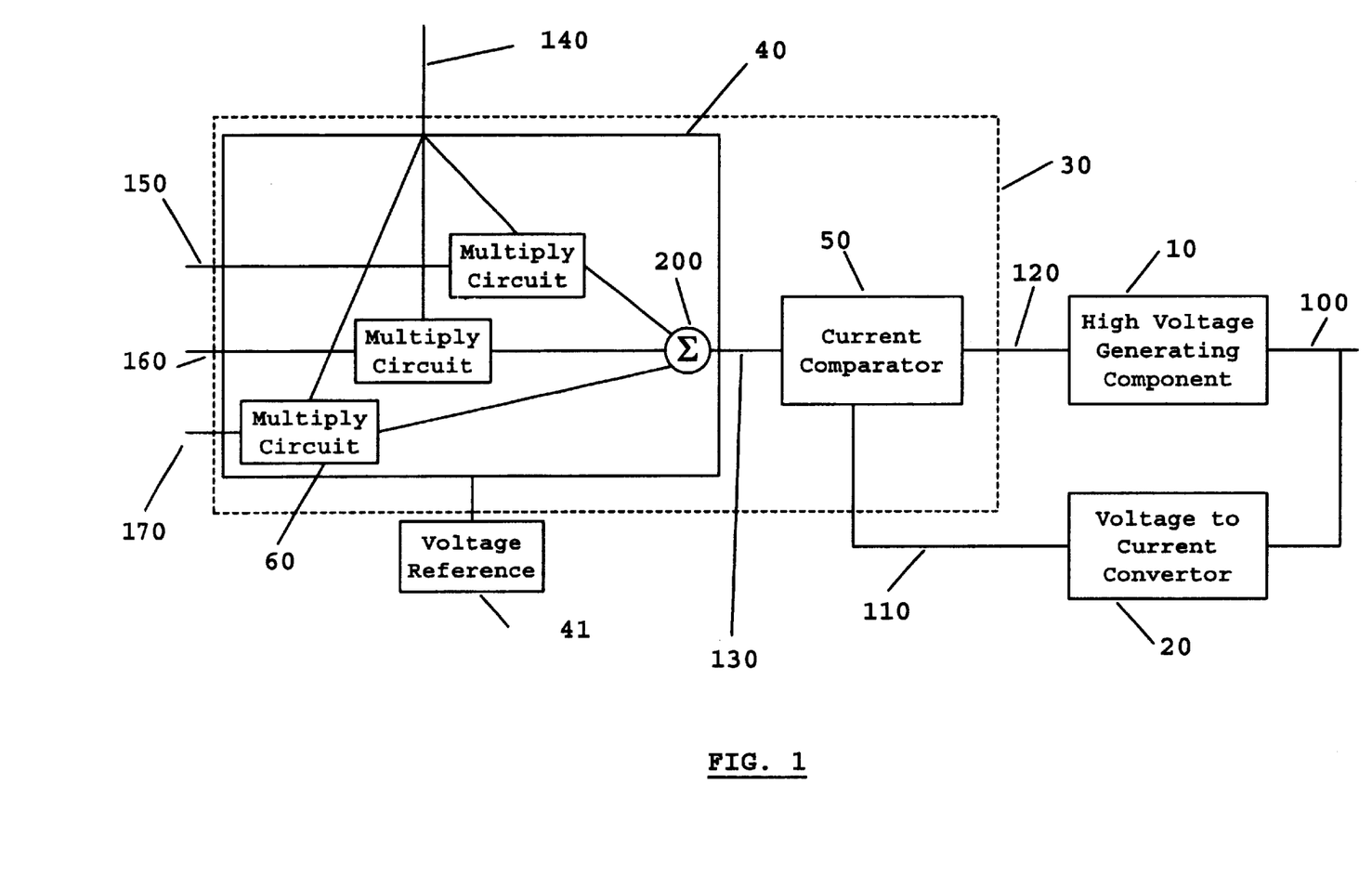
FIG. 1 represents a general overview of the different elements constituting the high-voltage generating device according to the invention.

FIG. 1 shows a schematic view of a device according to the present invention. In this FIG. 1, a high voltage generating device is thus presented with a high voltage generating component 10 having as input a voltage signal 120 constructed by a current control circuit 30 having as input at least one feedback current 110 which is related to the output voltage 100. Alternatively, said high voltage generating device can be described as comprising a high voltage generating component 10 having as input a voltage signal 120 constructed at least by comparing a reference current 130 and a feedback current 110 being related to the output voltage 100.

Said device further comprises a voltage to current convertor 20, generating said feedback current 110 on the basis of the output voltage 100.

Said device further comprises a current comparator 50 generating the voltage signal 120 by comparing the reference current 130 and the feedback current 110.

The current control of the high voltage generating component according to the invention enables a flexible operation of the device resulting in an easy selection of the required output voltage. A high voltage generating device with variable output voltage (within a certain range) is obtained.

The variability of the output voltage 100 is obtained by introducing a reference current 130 which can be easily modified by constructing it as a combination of a plurality of basis currents (150, 160, 170), preferably a linear combination. This means that the basis currents are added together in a summing operation after being multiplied with a certain constant. The basis currents are selected to be currents with a substantially different value. Said multiplication constant is preferably one or zero, which enables the use of a digital input. The high voltage generating device comprises a circuit 40 wherein each of the basis currents (having substantially different values) is selected to be part of said combination based on a digital input 140 and a voltage reference 41. Within said circuit 40 multiplying circuitry 60 and a current combination part 200 is found. Said multiplying can be adapted such that it takes into account the digital nature of the signals, thus the fact that either selection (in case of a 1) or non-selection (in case of a 0) of the basis current under consideration must be realised.

Figure 2:
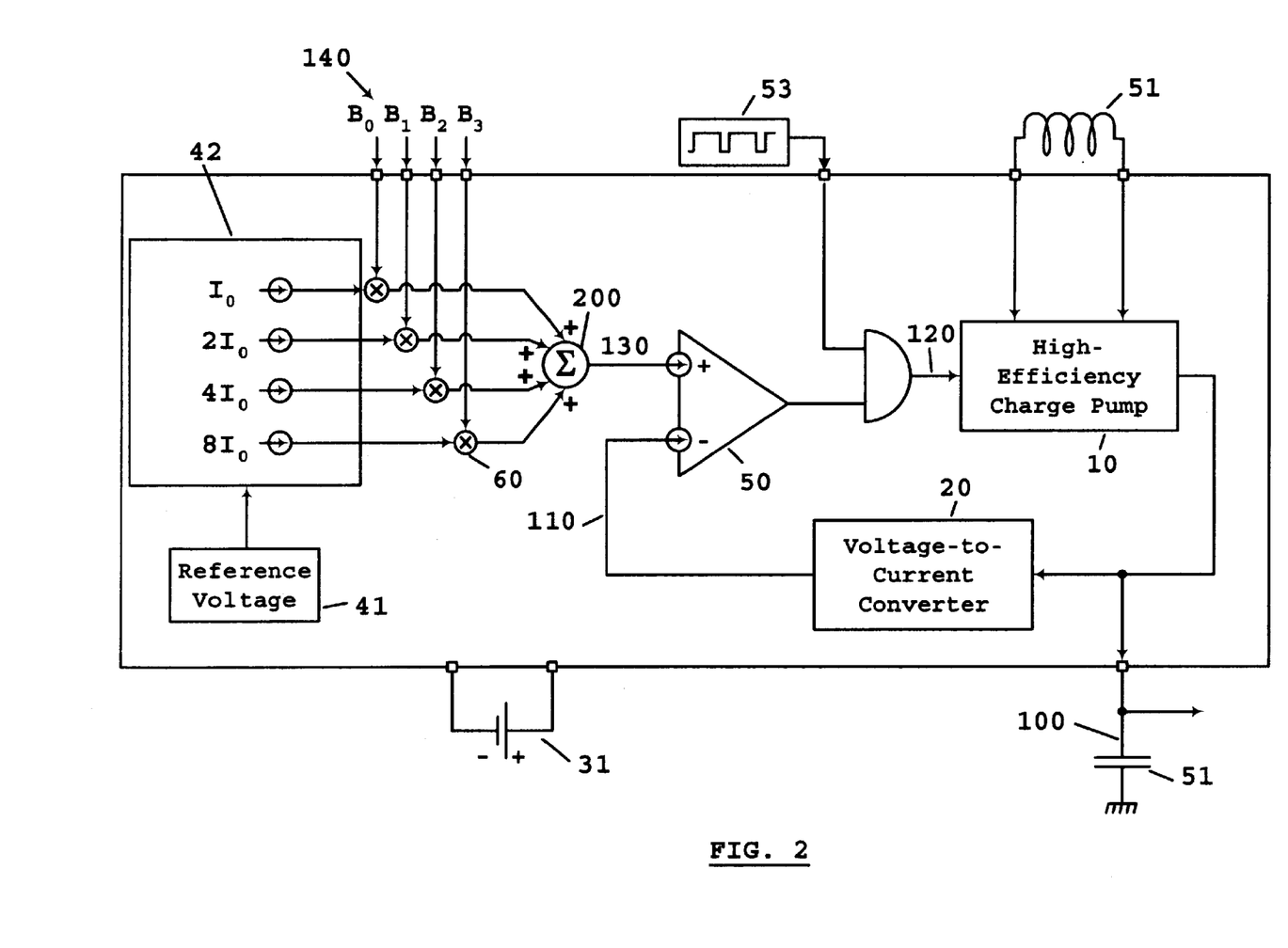
FIG. 2 represents a basic block diagram of the high-voltage generating device according to an exemplary embodiment of the invention.

A block diagram of an exemplary embodiment of the high voltage generator or high voltage generating device can be seen in FIG. 2. The device is driven by a supply voltage 31, having a voltage between 2.5V and 5V. First, an internal reference voltage 41 is converted by a voltage to current converter 42 into four current sources $I_0$, $2I_0$, $4I_0$ and $8I_0$, further denoted basis currents. These current sources are multiplied by the logical values (0 or 1) of the four input control bits $B_0$ to $B_3$, together defining the input signal 140, after which they are summed up, thus defining a reference current 130, which can have one out of sixteen linearly distributed current levels. This reference current is then compared to the feedback current 110, which is proportional to the high voltage generator's output voltage 100. According to the difference between these two current levels, a high-efficiency charge pump 10 is activated or disabled in order to compensate for the difference. In this way, one out of sixteen linearly distributed voltage levels is obtained at the generator's output terminal. By choosing appropriate values of the current source 10 and the transconductance of the voltage-to-current converter 20 connected to the output, a linear distribution of the output voltages in a range, for instance (but not limited thereto), a range from 0 to 100V is obtained.

In the embodiment of the invention of FIG. 2, the high voltage generator requires an inductor 51, which is an essential component in the case of the charge pump and a capacitor 52 at the output. This capacitor is not essential for the generator's operation, but allows much smoother output voltages to be obtained. Also the clock pulses for the charge pump have to be applied externally by an external oscillator 53. In still another embodiment, high-voltage generators are designed and fabricated in a 100V c07 $I^2T$ technology. Said components (inductors, capacitors) can either be mounted external to the chip (e.g., on the chip board or in the package of the chip with a multichip module technology or even internally on the chip).

In general, any high voltage generating component can be used. In the example of FIG. 2, a high voltage generating charge pump is used. The principle of operation of the charge pump can easily be understood on the basis of the circuit diagram of FIG. 3. On the high-level of a pulse from the external oscillator 53, the internal high-voltage NDMOS transistor 54 is switched on and behaves ideally as a short-circuit between its source and drain electrodes. Consequently, the inductor 51 receives the battery power supply voltage 31 and its current increases linearly in time. On the high-to-low transition of the clock pulse, the transistor 54 is switched off and the inductor current is forced to flow through the diode 55.

Figure 3:
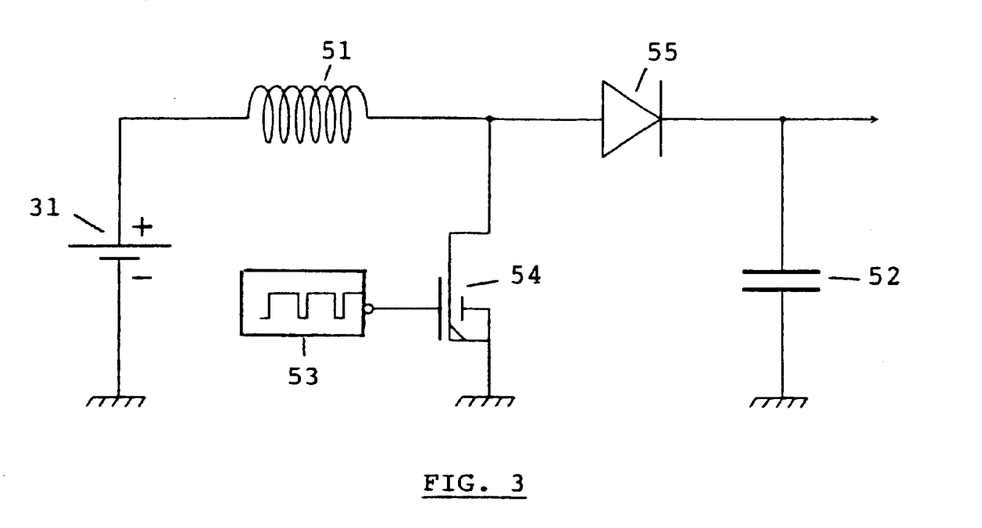
FIG. 3 is a schematic representation of the circuit in the high voltage charge pump.

Assuming that the generator's output voltage is already higher than the battery voltage, the current through the inductor will decrease in time (as there is inversion of the polarity of the voltage drop across the inductor) until it reaches the 0 Amps level. At that moment, the diode 55 becomes reverse-biased (as current inversion is not possible in a semiconductor diode) and the inductor current will remain at a constant 0 Amps level.

It is important to note that during the short conduction period of the diode 55, an amount of charge is injected by the inductor into the generator's output node, which is normally connected to a capacitor 52 for storing the charge. So, this circuit is capable of "pumping" periodically an amount of charge into the output capacitor 52, no matter how high the output voltage is with respect to the battery voltage. Of course, there is also a constant load current which slowly discharges the output capacitor. Therefore, the periodically injected amount of charge has to be large enough to compensate for this continuous loss of charge. If this condition is fulfilled, then the feedback control circuitry on the generator chip has to provide a self-regulating on/off control of the oscillator in order to maintain the output voltage at the desired level. The absolute maximum output voltage level that can be reached will depend on several factors such as the load current, the capacitance C of the capacitor 52 and the induction L of the inductor 51, the loss-factor of the inductor, the "on"-resistance of the NDMOS transistor and the breakdown voltage of the transistor 54 and the diode 55.

In a further aspect of the invention, features are presented which prevent occurrence of oscillations of the source-drain voltage of the NDMOS output transistor 54 in the charge pump 10 for certain combinations of parameter values and load impedance types. As the generator tries to maintain the output voltage at a well-defined level, the charge pump 10 is periodically activated and disabled at a very high speed, resulting in an instability. This could cause breakdown of the output transistor 54 and total failure of the high-voltage generator.

To avoid this problem, the possibility of providing hysteresis in the output voltage is presented in the device. This is realized by making the reference current 130 slightly adaptable, meaning within a certain range, based on the input voltage 120 of said high voltage generating component. Said range for adapting must be smaller than the level of the basis current with the smallest level. In this way, the charge pump remains in the activated or disabled state for a longer period of time, thereby preventing all kinds of instabilities.

Figure 4:
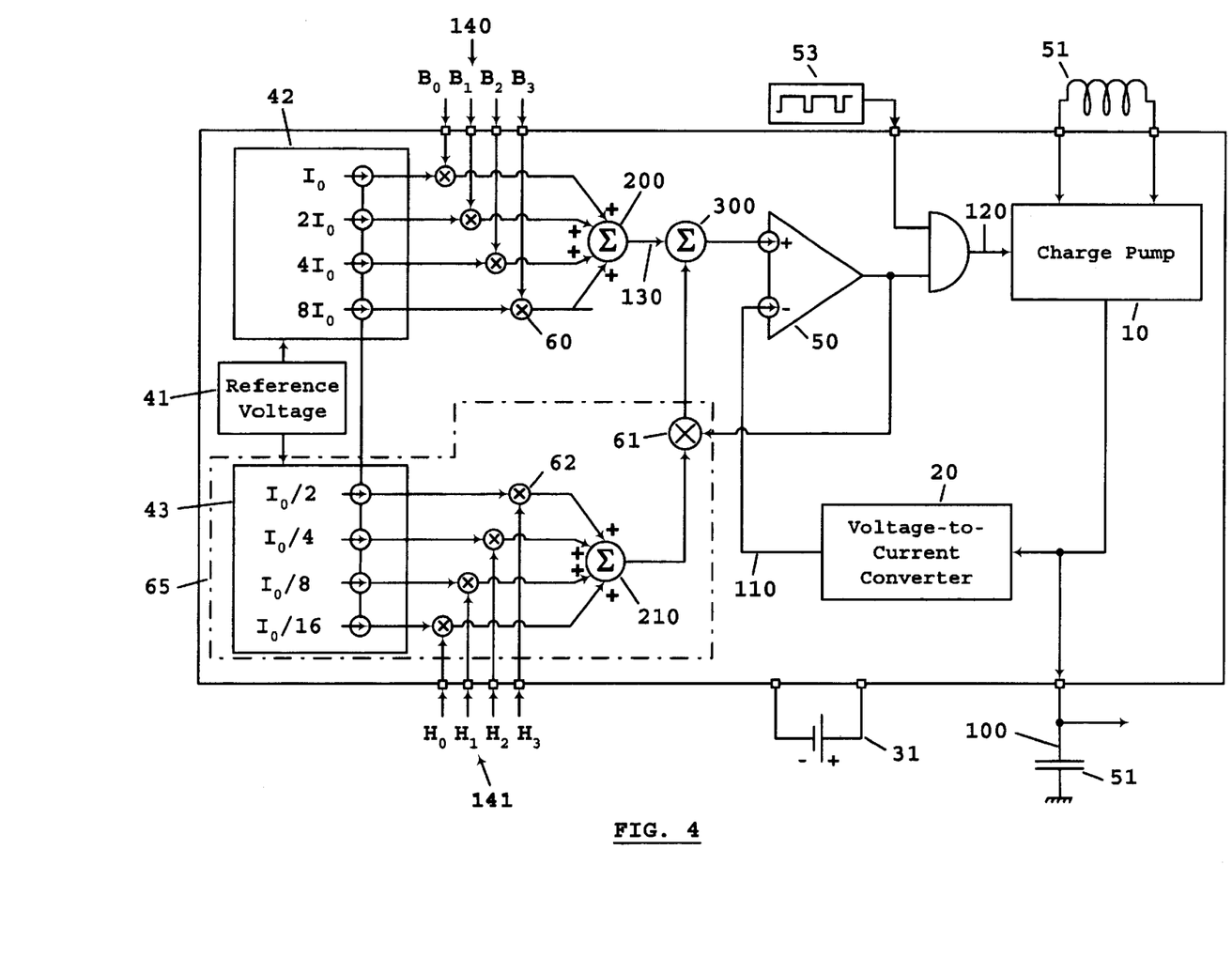
FIG. 4 represents a block diagram of a high-voltage generator with hysteresis according to the invention.

A block diagram of the HV-generator including a hysteresis block 65 is shown in FIG. 4. By the use of the voltage to current converter 43, four current sources $I_0/2$ till $I_0/16$, further denoted secondary basis currents, are converted into a current 201, having 1 out of 16 linearly distributed current levels controlled by the digital input bits $H_0$ till $H_3$. This current 201 is constructed by the use of multiplication means 62 and summing means 210. The resulting current 201 is then multiplied (using multiplication means 61) by the logical output bit of the current comparator 50. If the output state of the current comparator 50 is a logical "1" (meaning that the generator's output voltage is too low), then this current level 201 will be added 300 to the first internal current controlled by the bits $B_0$ till $B_3$. As a consequence, the output voltage 100 will rise up to a level that is proportional to the B-controlled current plus the H-controlled current. As soon as this level is reached, the output state of the current comparator 50 changes to a logical "0", the charge pump 10 is disabled and the output voltage starts to drop. At the same time, the current from the H-block is no longer added to the current from the B-block, and consequently, the generator's output voltage 100 will decrease until a level that is proportional to the B-controlled current only. When this occurs, the current comparator state changes, and the generator's output voltage will start to rise again. This means that the generator's output voltage 100 will exhibit a ripple of which the peak-to-peak amplitude is proportional to the H-controlled current. So, we obtain 16 linearly distributed values for the hysteresis voltage. From the choice of the internal current sources, it can be seen that the maximum value of the hysteresis voltage is a little bit less than the minimum step size (actually 15/16 LSB (Least Significant Bit)) of the programmable output voltage. If one chooses the circuit parameters in such a way that a linear control of the output voltage between 0V and 100V is obtained, than one can control the hysteresis voltage in an equally linear way in the range from 0V to 6.25V.

Another extra feature concerns once again stability problems, but this time in the voltage-to-current converter 42 for transforming the reference voltage 41 into the $I_0$-related currents. There can exist a very delicate equilibrium in the feedback loop of this voltage-to-current converter. This is solved by optimizing the circuit for obtaining maximum phase margin, small transistor parameter deviations (differences between the real parameter values and the simulation model values) and the possibility of connecting an external passive compensation network to one of the important nodes of the voltage-to-current converter to ensure perfect stability.

Equally according to the present invention, a flexible method for generating a high voltage output is presented. Said method is flexible because a variable high output voltage is selected by inputting a digital input signal, further used for constructing a reference current as a (linear) combination of basis currents with substantially different current values wherein each of said basis currents is being selected to be part of said (linear) combination according to said digital input signal. Said method is further characterised in that a feedback loop is present, meaning that the generating of the output voltage is related to an input voltage constructed by comparing said reference current with a feedback current being related said output voltage.

Finally, according to the present invention, the use of a high voltage apparatus, more in particular, the selection of said variable output voltage based on a digital input is presented.

EXAMPLES

Figure 5:
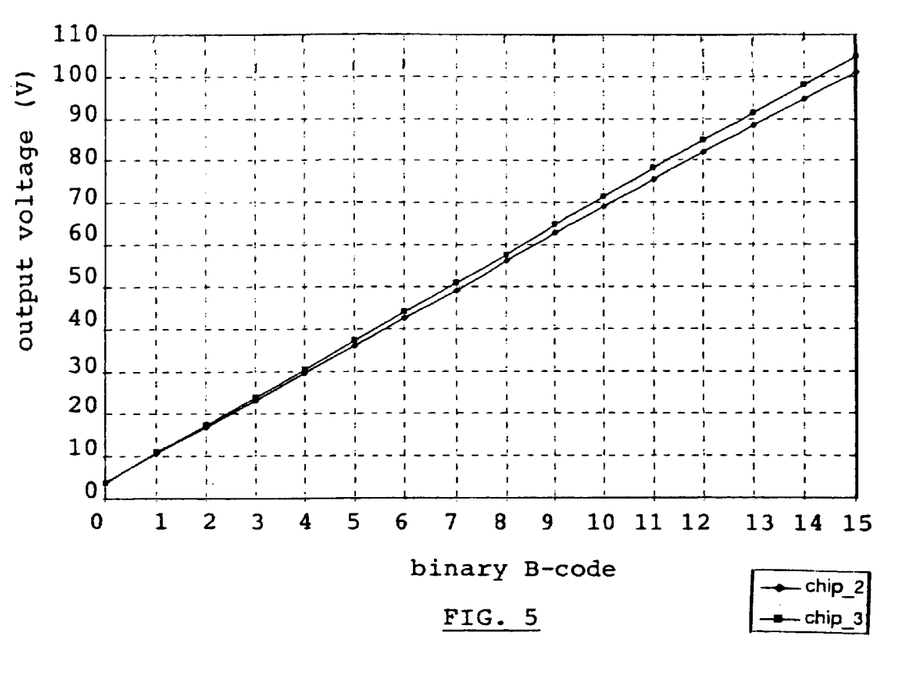
FIG. 5 gives the variations of the output voltage as a function of the B-code for the high-voltage generator with hysteresis according to the invention as presented in FIG. 4.

The test chip, containing the four different high-voltage generators, has a total silicon area of approximately 10 mm² and was fabricated in a 100V 0.7 μm CMOS I²T technology, using the EUROPRACTICE MPW (Multi Project Wafer) service. Fifty-four (54) samples were made, of which ten (10) were packaged in a 48-pins DIL ceramic carrier and forty-four (44) were naked dies. In order to verify whether these HV-generators operate as predicted by the simulations, a series of measurements were carried out on five of the ten packaged samples. Table I gives the values of the measured output voltage as a function of the B-code (i.e., the 4-bit digital word $B_3B_2B_1B_0$) for the complete high-voltage generator of FIG. 4. The H-code (i.e., the 4-bit digital code $H_3H_2H_1H_0$) was chosen to be "0" (meaning that the generator operates without any additional hysteresis), and the external component parameters were: L=200 μH, C=15 nF, load=3.5MΩ, oscillator frequency=157 kHz, oscillator duty ratio=75%, battery voltage=3V. The table I contains the output voltage values of the chips numbers 2 and 3, being the extreme corners of the five samples. This means that the output voltage of the other three samples always lies within the interval delimited by the values of the samples 2 and 3. These data are shown graphically in FIG. 5. From these measurement data, one can already conclude that the experimental output voltage range is indeed very close to the desired 100V-range. It is also very clear that the output voltage can be controlled in an almost perfectly linear way by means of the digital input-bits $B_0$, $B_1$, $B_2$ and $B_3$, and one can also observe that the output voltage is fairly device-independent and therefore reproducible. The same kind of experiment was also performed on the high-voltage generator configuration of FIG. 2 (i.e., without the hysteresis block).

Figure 6:
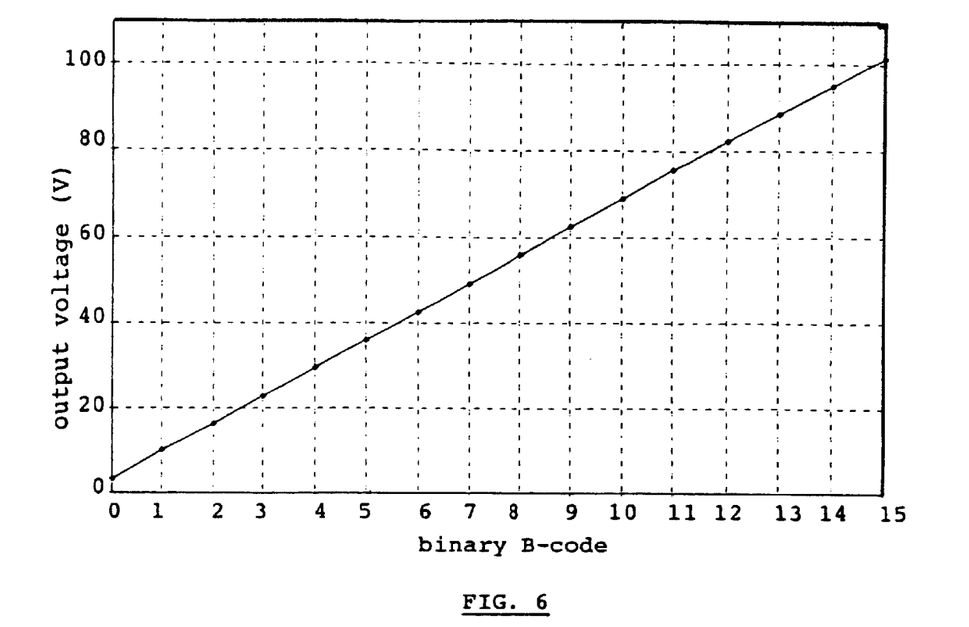
FIG. 6 gives the variations of the output voltage as a function of the B-code for the high-voltage generator without hysteresis according to the invention as presented in FIG. 2.
Figure 7:
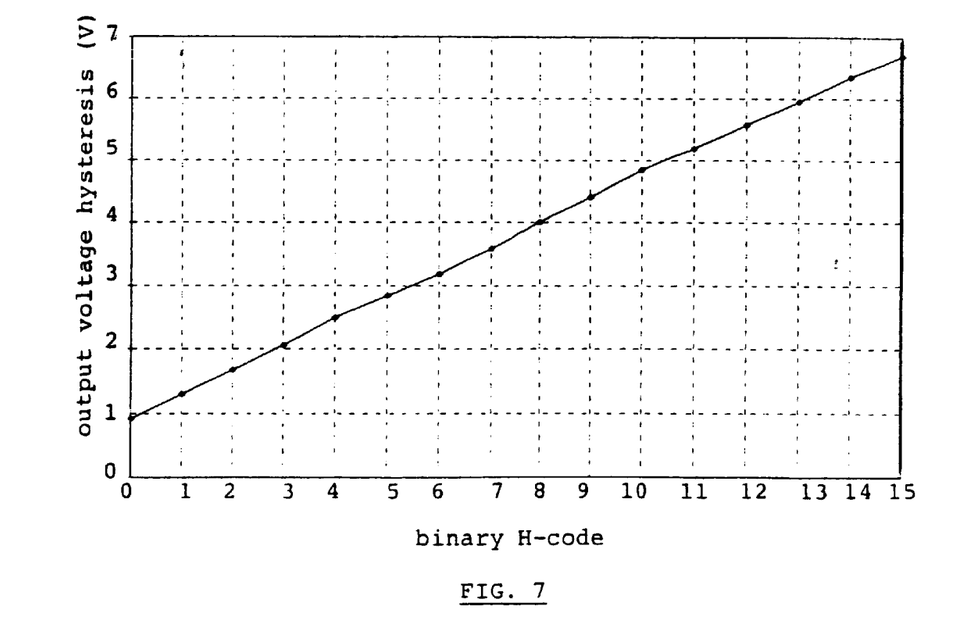
FIG. 7 gives the variations of the output voltage ripple as a function of the binary H-code for the high-voltage generator with hysteresis according to the invention as presented in FIG. 4.

FIG. 6 shows an example of the measurement of the output voltage vs. the binary B-code for such a generator. Also here, the excellent linearity and the desired 100V output voltage operation can easily be observed. By means of the input bits $H_0$ till $H_3$, the ripple of the generator's output voltage can be digitally controlled and set to sixteen linearly distributed values. FIG. 7 shows the measured output voltage ripple (peak-to-peak value) as a function of the binary H-code for the HV-generator configuration of FIG. 4 when the output voltage is set to about 57V (B=8).

The external component parameters are still the same as for the previously mentioned experiments. From this plot it can be seen that a linear control of the output voltage hysteresis is obtained. Theoretically, for H=0 the output voltage ripple should be zero, but the measurements indicate that a minimum ripple of about 900 mV is present. This is a result of the fact that the on-chip feedback control circuitry cannot respond at an infinite speed to changes in the output voltage. So, due to this internal speed limitation, a minimum output voltage ripple will always be detected. Of course, the exact value of this minimum ripple will highly depend on external component parameters, such as the value of the output capacitor, the inductor and the oscillator frequency. By an appropriate choice of these parameters, an arbitrary small output voltage ripple (at H=0) can be obtained. The objective of the hysteresis module in the HV-generator block diagram of FIG. 3 was to prevent dangerous oscillations at the drain terminal of the NDMOS output transistor for certain combinations of parameter values and load impedance types.

Figure 8:
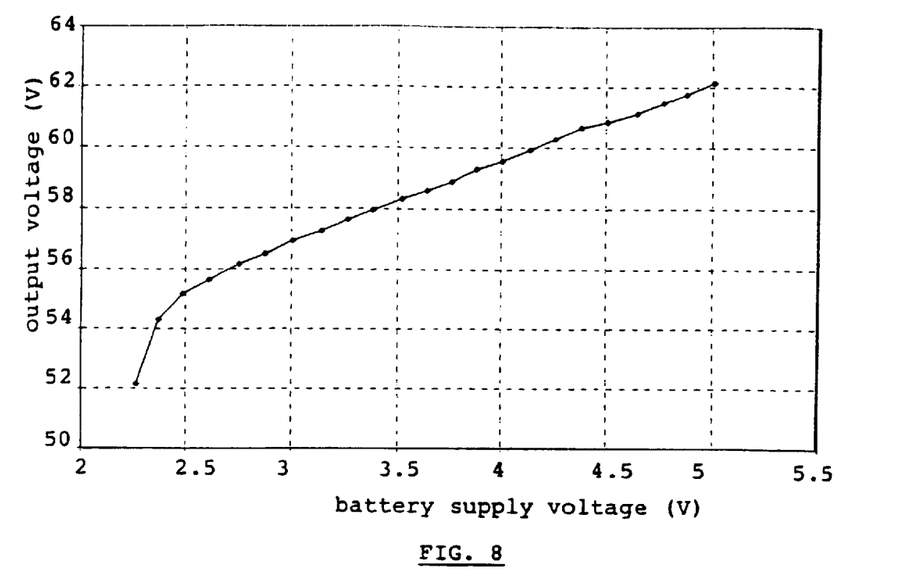
FIG. 8 gives the variations of the output voltage as a function of the battery supply voltage in the generator according to the invention, when said battery supply voltage varies in the range 2.25 V–5 V.

A very important characteristic of this high-voltage generator is its power supply rejection ratio. The circuit should be able to produce a stable and well-defined output voltage, even if there is a significant drop of the battery voltage. To determine this parameter, one measures the output voltage of the HV-generator from FIG. 4 as a function of the battery supply voltage for B=8 and H=0. The values of the external components were: L=200 μH, C=15 nF, load=3.5MΩ, oscillator frequency=157 kHz, oscillator duty ratio=75%. FIG. 8 shows the results of the measurements for a battery supply voltage between 2.25V (below this voltage the generator doesn't work anymore) and 5V (higher supply voltages may cause breakdown of the internal transistors). Here a 3V battery supply is used, and hence only the range from 2.5V to 3.5V is of interest in the case considered here. This range includes the possible peak voltage in case of a "fresh" battery, as well as the voltage level of a nearly empty battery. This 2.5V ↔ 3.5V battery voltage range and the corresponding generator's output voltage are shown in detail in FIG. 9.

Figure 9:
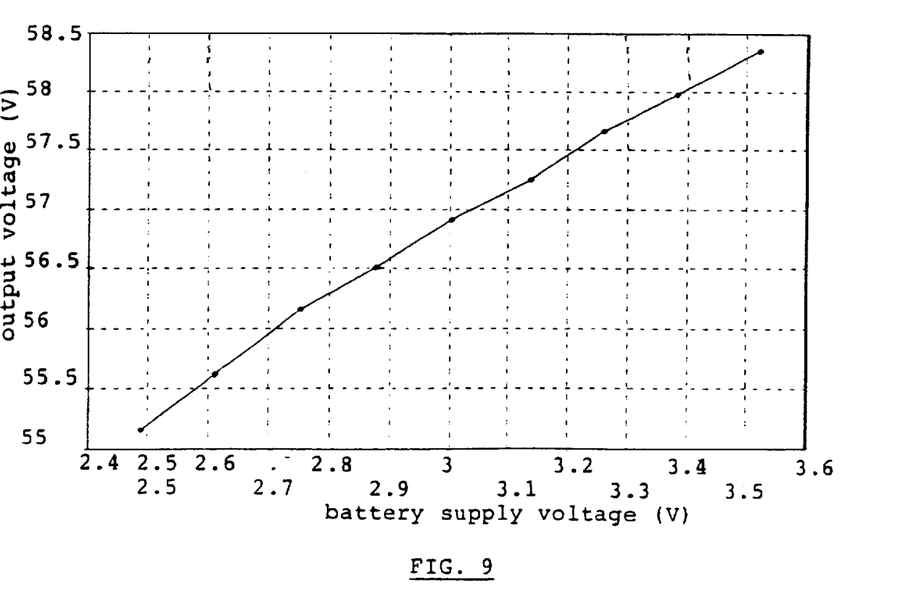
FIG. 9 gives the variations of the output voltage as a function of the battery supply voltage in the generator according to the invention, when said battery supply voltage varies in the range 2.5 V–3.5 V.

From FIG. 9 one learns that a battery voltage variation of 1V around the nominal 3V-value causes an output voltage variation of about 3V around a nominal value of approximately 56.9V. In other words, a battery supply voltage variation of ±16.7% results in an output voltage variation of only ±2.6%. This is a clear illustration of the good quality of the internal voltage reference. In the design of this high-voltage generator, it was also of the utmost importance to make the output resistance of the generator as low as possible, meaning that the circuit should be able to produce an output voltage that is nearly independent of the output current. To find out whether the circuit meets this requirement, one measures the output voltage as a function of the load current in the HV-generator configuration of FIG. 4 with B=8 and H=0. The values of the external component parameters were: C=15 nF, oscillator frequency=166 kHz, oscillator duty ratio=75%, battery voltage=3V. For the external inductor, two different values have been chosen: L=100 μH and L=200 μH.

Figure 10:
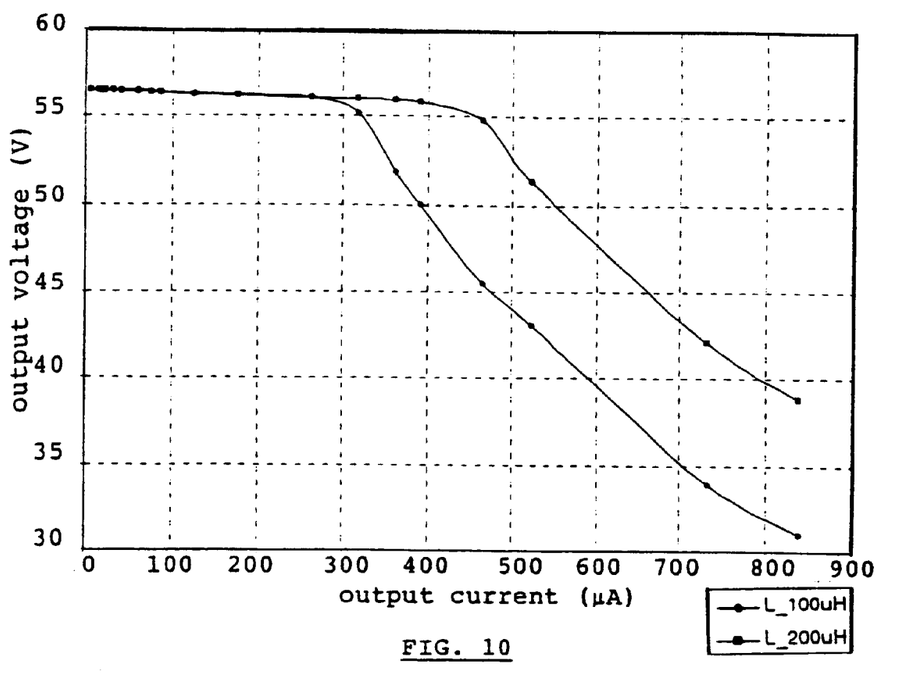
FIG. 10 gives the variations of the output voltage as a function of the output current in the generator according to the invention when said output current varies in the range 0–900 $\mu A$.
Figure 11:
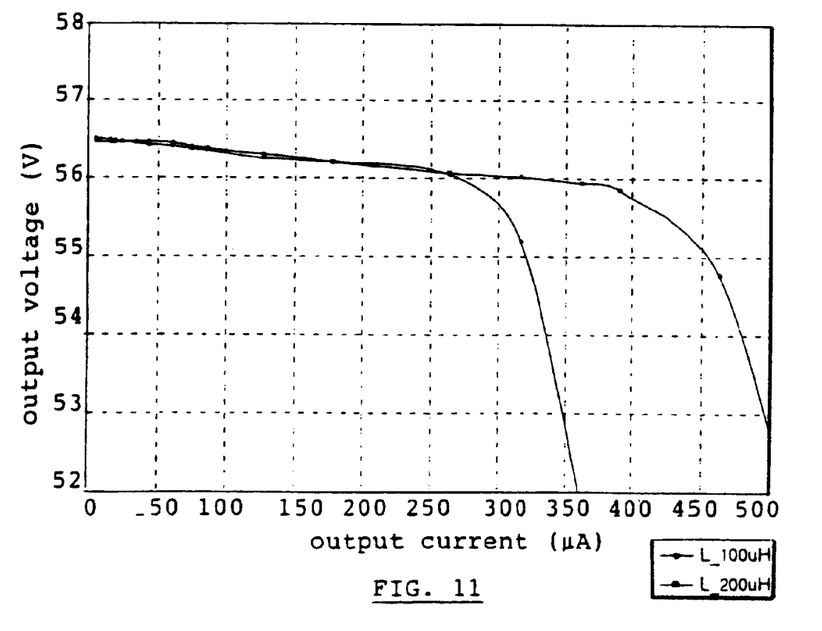
FIG. 11 is a detail of FIG. 10 in the range 0–500 $\mu A$.

FIG. 10 and FIG. 11 (detail) show the results of this experiment. In these graphs, it is seen that the output voltage remains almost constant for increasing values of the load current until a critical current level is reached. From that moment on, the output voltage begins to drop rapidly as the current increases. The reason for this rapid voltage drop because at high load current levels, the periodic injection of charge from the inductor into the output capacitor can no longer compensate for the continuous loss of charge due to the load current, and hence the output voltage can no longer be pumped up to the desired level. For an external inductor of 100 $\mu$H, the output voltage is fixed at a nearly constant level for load currents below about 300 $\mu$A, while a stable output voltage is obtained for current levels up to about 400 $\mu$A if a 200 $\mu$H external inductor is used.

This illustrates very clearly how the properties of this high-voltage generator can be adjusted and tuned by choosing adequate values of the external components. In this way, by tuning the external inductor, the oscillator frequency and the oscillator duty ratio, an output current range (with stable output voltages) in excess of 1 mA can be achieved.

Another important figure of merit in high-voltage generator design is the power efficiency of the circuit, defined as the ratio between the useful output power and the total amount of power supplied by the battery.

Figure 12:
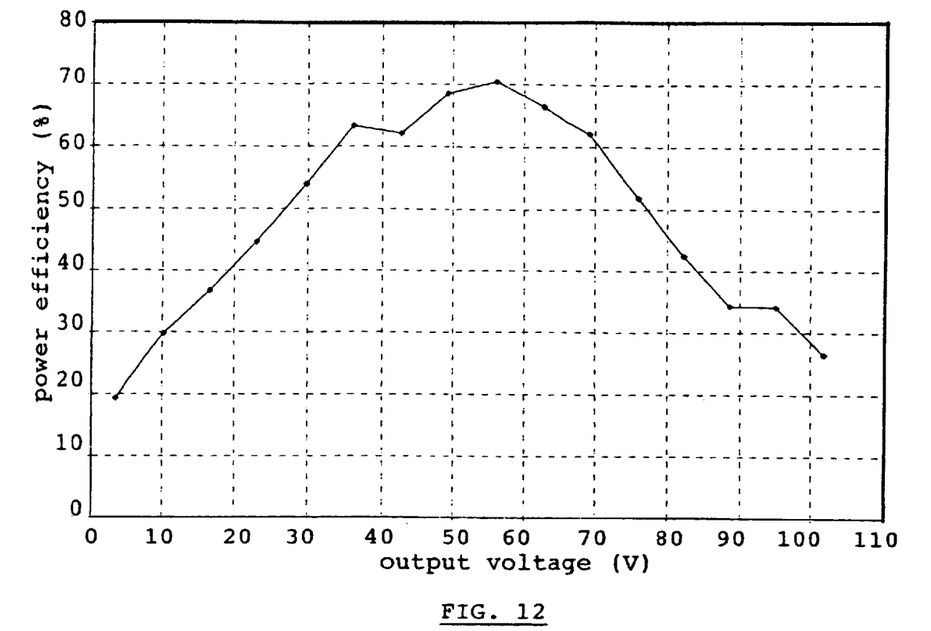
FIG. 12 gives the variations of the power efficiency as a function of the output voltage for the high-voltage generator without hysteresis according to the invention and as presented in FIG. 2.

FIG. 12 gives an example of the measured power efficiency as a function of the generated output voltage for the circuit configuration of FIG. 2. The external component parameters were: L=470 $\mu$H, C=15 nF, load current=250 $\mu$A, battery voltage=3V, oscillator frequency=114 kHz, oscillator duty ratio=75%. One observes that a maximum power efficiency of about 70% is achieved at an output voltage level of approximately 55V. This maximum can easily be shifted towards lower or higher voltage levels by choosing appropriate values for the external components.

One can conclude that a digitally programmable high voltage output (e.g. 0–100V) is obtained starting from a small basic voltage, meaning the power supply, (e.g., a 3V battery power supply) with excellent linearity and reproducibility. A programmable hysteresis of the generator's output voltage with a very good linearity is demonstrated. The power supply rejection ratio is very good; the relative output voltage variation are 6.4 times smaller than the relative battery supply voltage variations around the nominal 3V-value. The output voltage remains almost constant for output currents ranging from 0 to several hundreds of microAmps. By an appropriate choice of the external components, this output current range can be extended to more than 1 mA. Power efficiencies of 70% are obtained. This value can be increased to 90% by using improved low-loss external indutors and by increasing the channel width of the output transistor.

TABLE I

| | Output voltage (V) | |
|---|---|---|
| B-code | chip 2 | chip 3 |
| 0 | 3.74 | 3.62 |
| 1 | 10.76 | 10.9 |
| 2 | 16.9 | 17.53 |
| 3 | 23.17 | 23.95 |
| 4 | 29.57 | 30.44 |
| 5 | 36.13 | 37.21 |
| 6 | 42.64 | 44.08 |
| 7 | 49.12 | 50.85 |
| 8 | 56.14 | 57.74 |
| 9 | 62.85 | 64.79 |
| 10 | 69.17 | 71.56 |
| 11 | 75.59 | 78.2 |

TABLE I-continued

| | Output voltage (V) | |
|---|---|---|
| B-code | chip 2 | chip 3 |
| 12 | 82.05 | 84.85 |
| 13 | 88.59 | 91.41 |
| 14 | 94.7 | 98.14 |
| 15 | 101.1 | 104.7 |

What is claimed is:

1. A high voltage generating device comprising:
   a high voltage generating component, generating an output voltage and having as input a voltage signal constructed at least by comparing a reference current and a feedback current;
   a voltage to current convertor, generating said feedback current on the basis of said output voltage; and
   means for adapting said reference current according to said voltage signal.

2. The device according to claim 1, wherein said device is driven by a low supply voltage, and wherein said output voltage is equal to or higher than said supply voltage.

3. The device recited in claim 2, comprising a current comparator, generating said voltage signal by comparing said reference current and said feedback current.

4. The device recited in claim 2, wherein said high voltage generating component is a charge pump.

5. The device recited in claim 4, comprising an external inductance, an external capacitance, and an external oscillator.

6. A high voltage generating device comprising:
   a high voltage generating component, generating an output voltage and having as input a voltage signal constructed at least by comparing a reference current and a feedback current, wherein said reference current is constructed as a combination of a plurality of basic currents;
   a voltage to current convertor, generating said feedback current on the basis of said output voltage; and
   means for adapting said reference current according to said voltage signal.

7. The device recited in claim 6, wherein said combination is a linear combination.

8. The device recited in claim 6, comprising circuitry wherein each of said plurality of basis currents is selected to be part or not to be part of said combination, based on a digital input to said circuitry.

9. The device recited in claim 7, comprising circuitry wherein each of said plurality of basis currents is selected to be part or not to be part of said combination, based on a digital input to said circuitry.

10. The device recited in claim 8, wherein said circuitry comprises:
    a voltage to current converter to provide basis currents based on a voltage reference;
    means for multiplying said basis currents with a coefficient, said coefficient being the logical value of one of a first set of input control bits; and
    means for summing said basis currents after said multiplying, said summing resulting in said reference current.

11. The device recited in claim 9, wherein said circuitry comprises:
    a voltage to current converter to provide basis currents based on a voltage reference;

means for multiplying said basis currents with a coefficient, said coefficient being the logical value of one of a first set of input control bits; and means for summing said basis currents after said multiplying, said summing resulting in said reference current.

12. The device recited in claim 3, wherein said means for adapting said reference current is such that the reference current is adaptable according to said voltage signal within a range being smaller than the current level of the basis current with the smallest level.

13. A high voltage generating device, wherein said device is driven by a low supply voltage, and wherein said output voltage is equal to or higher than said supply voltage, said device comprising:

a high voltage generating component, generating an output voltage and having as input a voltage signal constructed at least by comparing a reference current and a feedback current;

a voltage to current convertor, generating said feedback current on the basis of said output voltage;

means for adapting said reference current according to said voltage signal such that the reference current is adaptable according to said voltage signal within a range being smaller than the current level of the basis current with the smallest level, wherein said means for adapting said reference current according to said voltage signal comprise a hysteresis block, said block comprising:

a voltage to current converter for providing a plurality of basis currents;

means for multiplying said basis currents with a coefficient, said coefficient being the logical value of one of a second set of input control bits;

means for summing up said basis currents after said multiplying;

means for multiplying said summed current with a coefficient, said coefficient being the digital output of said current comparator); and means for adding said current after said multiplying to said reference current; and a current comparator, generating said voltage signal by comparing said reference current and said feedback current.

14. A high voltage generating device being designed and fabricated in a 100V c07 $I^2T$ technology, said device comprising:

a high voltage generating component, generating an output voltage and having as input a voltage signal constructed at least by comparing a reference current and a feedback current;

a voltage to current convertor, generating said feedback current on the basis of said output voltage; and means for adapting said reference current according to said voltage signal.

15. The device recited in claim 1, wherein a output voltage magnitude is determined by inputting said digital input.

16. A method for generating a high voltage comprising the steps of:

inputting a digital input signal;

constructing a reference current as a combination of basis currents with substantially different current values wherein each of said basis currents is selected to be part or not to be part of said combination on the basis of said digital input signal; and generating an output voltage being related to an input voltage constructed by comparing said reference current with a feedback current being related to said output voltage.

* * * * *